US011215566B2

(12) United States Patent
Shelley, Jr. et al.

(10) Patent No.: US 11,215,566 B2
(45) Date of Patent: Jan. 4, 2022

(54) SYSTEM AND METHOD FOR INTERNALLY INSPECTING A TUBULAR COMPOSITE PART

(71) Applicant: The Boeing Company, Chicago, IL (US)

(72) Inventors: Paul H. Shelley, Jr., Lakewood, WA (US); Christopher Wayne Fay, Seattle, WA (US)

(73) Assignee: The Boeing Company, Chicago, IL (US)

( * ) Notice: Subject to any disclaimer, the term of this patent is extended or adjusted under 35 U.S.C. 154(b) by 799 days.

(21) Appl. No.: 15/209,979

(22) Filed: Jul. 14, 2016

(65) Prior Publication Data
US 2018/0017505 A1    Jan. 18, 2018

(51) Int. Cl.
  *G01N 21/94*    (2006.01)
  *G02B 23/26*    (2006.01)
  (Continued)

(52) U.S. Cl.
  CPC ............ *G01N 21/94* (2013.01); *G01J 3/0221* (2013.01); *G01N 21/954* (2013.01);
  (Continued)

(58) Field of Classification Search
  CPC ............................... G01J 3/0221; G01N 21/94
  (Continued)

(56) References Cited

U.S. PATENT DOCUMENTS

| 4,849,626 A | 7/1989 | Franklin, Jr. |
| 5,973,778 A | 10/1999 | Hunt |

(Continued)

FOREIGN PATENT DOCUMENTS

| EP | 1 503 206 A1 | 2/2005 |
| EP | 2 639 572 A2 | 9/2013 |
| JP | 2007-232577 A | 9/2007 |

OTHER PUBLICATIONS

Extended European Search Report from corresponding European Patent Application No. 17162907.4, dated Oct. 6, 2017, 10 pages.
(Continued)

*Primary Examiner* — David P Porta
*Assistant Examiner* — Carolyn Fin
(74) *Attorney, Agent, or Firm* — The Small Patent Law Group LLC; Joseph M. Butscher (57) ABSTRACT

A system and method for internally inspecting a tubular composite part so as to identify and measure adhesive flow therewithin are provided, along with an endpoint adapter assembly of a near infrared (NIR) spectrometer. The system includes an end point adapter that fits within and maintains a consistent cross-sectional position within the tubular composite part. The system also includes a plurality of optical fibers extending radially outward from the end point adapter. The end point adapter moves longitudinally through the tubular composite part and receives light with the plurality of optical fibers following interaction of the light with the tubular composite part. The system further includes a NIR imaging spectrometer configured to disperse the light being collected by the plurality of optical fibers across an NIR spectrum and a NIR camera configured to generate images of the tubular composite part based on dispersed light.

20 Claims, 8 Drawing Sheets

(51) Int. Cl.
  *G01J 3/02* (2006.01)
  *G02B 23/24* (2006.01)
  *G01N 21/954* (2006.01)
  *G01N 21/84* (2006.01)
  *G01N 21/359* (2014.01)

(52) U.S. Cl.
  CPC ......... *G02B 23/2476* (2013.01); *G02B 23/26* (2013.01); *G01N 21/359* (2013.01); *G01N 2021/8472* (2013.01); *G01N 2021/9546* (2013.01); *G01N 2201/061* (2013.01); *G01N 2201/0833* (2013.01)

(58) Field of Classification Search
  USPC .................................. 356/303, 300; 250/353
  See application file for complete search history.

(56) References Cited

U.S. PATENT DOCUMENTS

| | | |
|---|---|---|
| 7,145,147 B1 | 12/2006 | Shelley et al. |
| 7,157,717 B2 | 1/2007 | Shelley et al. |
| 7,251,027 B2 | 7/2007 | Gylys et al. |
| 7,473,898 B2 | 1/2009 | Holly et al. |
| 7,486,250 B2 | 2/2009 | Vetrovec et al. |
| 7,507,979 B2 | 3/2009 | Vetrovec et al. |
| 7,570,349 B2 | 8/2009 | Vachss et al. |
| 8,051,715 B2 | 11/2011 | Heck et al. |
| 8,218,142 B2 | 7/2012 | Wilcken |
| 8,338,787 B1 | 12/2012 | Shelley et al. |
| 8,525,990 B2 | 9/2013 | Wilcken |
| 8,835,854 B2 | 9/2014 | Dean et al. |
| 8,853,634 B2* | 10/2014 | Shelley, Jr. ........ G01N 21/8806 250/353 |
| 2005/0194187 A1* | 9/2005 | Gleitman ................. E21B 4/04 175/57 |
| 2006/0209301 A1 | 9/2006 | Gardner, Jr. et al. |
| 2007/0132990 A1 | 6/2007 | Fukami et al. |
| 2007/0206185 A1 | 9/2007 | Tuschel et al. |
| 2009/0257046 A1* | 10/2009 | Dean ........................ G01J 1/02 356/51 |
| 2010/0208238 A1 | 8/2010 | Wilcken |
| 2012/0217068 A1* | 8/2012 | Toscher ................. E21B 7/04 175/61 |
| 2013/0234030 A1 | 9/2013 | Shelley, Jr. et al. |
| 2014/0090846 A1* | 4/2014 | Deutch ................. E21B 29/00 166/297 |
| 2016/0146741 A1 | 5/2016 | Shelly, Jr. et al. |
| 2016/0178533 A1 | 6/2016 | Gladnick |
| 2018/0112506 A1* | 4/2018 | Martysevich ......... E21B 43/114 |
| 2018/0119503 A1* | 5/2018 | McInally ................ E21B 23/14 |

OTHER PUBLICATIONS

Shelley, P. et al. "Handheld Infrared Spectroscopy for Composite Non-Destructive Testing." SAMPE Technical Conference Proceedings, Long Beach CA, May 23-26, 2011. Society for the Advancement of Material and Process Engineering.

Ellis, J. "Searching for oil seeps and oil-impacted soil with hyperspectral imagery." Earth Observation Magazine, Jan. 2001.

Hyvärinen, T. et al. "High-Speed Hyperspectral Chemical Imaging." 13th International Conference on Near Infrared Spectroscopy. Umeå, Sweden, 2007.

Chinese office action dated Jul. 20, 2020 relating to application No. 201710454628.2.

Korean office action dated Dec. 28, 2020 relating to application No. 10-2017-0063674.

* cited by examiner

| Item | Part | Area | Fwd / Aft | Defect Type | Location | Width | Depth | Length | W/D ratio |
|---|---|---|---|---|---|---|---|---|---|
| 1 | upper | T1 | aft | pocket | 21.5 | 0.21 | 38.7 | 22.0 | 6.4 (@ 36.1) |
| 2 | upper | T1 | aft | pocket | 46.7 | 0.25 | 35.6 | 13.6 | 7.0 (@ 59.1) |
| 3 | upper | T1 | fwd | pocket | 82.9 | 0.89 | 23.8 | 13.9 | 33.8 (@ 83.7) |
| 4 | upper | T1 | fwd | pocket | 376.1 | 0.15 | 22.4 | 2.7 | 6.6 (@ 377.2) |
| 5 | upper | M1 | aft | pocket | 58.3 | 0.30 | 24.2 | 4.8 | 12.6 (@ 61.6) |
| 6 | upper | M1 | aft | pocket | 77.3 | 0.14 | 41.3 | 27.0 | 3.4 (@ 84.9) |
| 7 | upper | M1 | aft | pocket | 112.2 | 0.15 | 36.7 | 34.2 | 4.1 (@ 121.1) |
| 8 | upper | M1 | fwd | pocket | 32.0 | 0.49 | 35.6 | 27.4 | 4.8 (@ 42.4) |
| 9 | upper | M1 | fwd | richness | 38.0 | 0.34 | 23.1 | 65.9 | 14.7 (@ 59.3) |
| 10 | upper | M1 | fwd | pocket | 61.8 | 0.39 | 31.2 | 17.5 | 12.4 (@ 71.7) |

Figure 11

SYSTEM AND METHOD FOR INTERNALLY INSPECTING A TUBULAR COMPOSITE PART

TECHNOLOGICAL FIELD

An example embodiment relates generally to a system and method for internally inspecting a tubular composite part and, more particularly, to a system and method employing an endpoint adapter configured to be moved through a tubular composite part so as to identify and measure adhesive flow and resin pocket thickness therewithin.

BACKGROUND

Parts are commonly inspected, both during the initial assembly of a structure incorporating a part and thereafter during the lifetime of the structure, in order to identify anomalies that may need to be addressed prior to placing or returning the structure to service. Some parts are more challenging than other parts to reliably inspect. In this regard, tubular parts, particularly tubular parts having a relatively small cross-sectional area, may be more challenging to inspect than other more laminar structures. However, it is still frequently desirable to inspect such tubular parts to identify anomalies. For example, in instances in which the tubular part is a component of a composite structure, the inspection of the tubular part is desirable in order to detect the presence of resin or adhesive material within the tubular part, such as to detect the formation of resin pockets therewithin. In this regard, the presence of resin or adhesive within a tubular part may be indicative of a structural anomaly and may merit further consideration by a technician to ensure that the presence of resin or adhesive is addressed if the resin or adhesive, such as a resin pocket, is potentially indicative of a reduction in the structural integrity of the composite structure or an imperfection in the process of fabricating the composite structure.

A vent stringer of an aircraft is an example of a tubular part that is a component of a composite structure. Vent stringers are generally cured and are then mounted to an uncured wing skin utilizing a film adhesive. During subsequent curing of the wing skin within an autoclave, the film adhesive is also cured. In some instances, the film adhesive may flow into the interior of the vent stringer. As excess adhesive may create issues for the fuel system if the excess adhesive should come loose, vent stringers are inspected to determine the extent of the adhesive, if any, within the vent stringer such that measures may be taken to reduce the extent of the adhesive if an excess amount of adhesive is detected within the vent stringer.

As a result of their shape and size, vent stringers and other tubular parts have proven to be challenging to inspect. Visible images of the interior of a tubular part have been collected and analyzed for purposes of inspecting the tubular part. The resulting visible images permit resin and adhesive that is within the tubular part to be identified. However, the visible images of the interior of the tubular parts generally do not permit the resin or adhesive that is detected therewithin to be quantified, such as in terms of area, length, width, depth or the like. Without quantification of the adhesive or resin that is detected within a tubular part, a technician may be unable to reliably determine whether the adhesive or resin that is identified within the tubular part merits any remedial action prior to placing or returning the structure that incorporates the tubular part into service.

BRIEF SUMMARY

A system and method for internally inspecting a tubular composite part so as to identify and measure adhesive flow and resin pocket thickness therewithin are provided, along with an endpoint adapter assembly of a near infrared (NIR) spectrometer. The system, endpoint adapter assembly and method of example embodiments of the present disclosure permit adhesive flow to not only be identified, but also quantified, such as in terms of depth, area, length, width, etc. Based upon the quantification of adhesive flow identified within a tubular composite part, an educated determination may be made as to whether the tubular composite part should be subjected to further processing in order to address the adhesive flow therewithin. Thus, the system, endpoint adapter assembly and method of example embodiments of the present disclosure provide for the reliable and detailed internal inspection of tubular composite parts such that the resulting structures incorporating the tubular composite parts may operate with enhanced reliability.

In an example embodiment, a system is provided for internally inspecting a tubular composite part to identify and measure adhesive flow therewithin. The system of this example embodiment includes an end point adapter configured to fit within and to maintain a consistent cross-sectional position within the tubular composite part. The system also includes a plurality of optical fibers extending radially outward from the end point adapter. The end point adapter is configured to be moved longitudinally through the tubular composite part so as to receive light with the plurality of optical fibers following interaction of the light with the tubular composite part at each of a plurality of determinable longitudinal positions within the tubular composite part. The system of an example embodiment also includes a near infrared (NIR) imaging spectrometer configured to disperse the light being collected by each of the plurality of optical fibers across an NIR spectrum. The system of this example embodiment further includes a NIR camera configured to generate images of the tubular composite part based on light being collected by each of the plurality of optical fibers following dispersal across the NIR spectrum.

The end point adapter of an example embodiment is configured to be positioned within the tubular composite part such that a respective optical fiber is perpendicular to that portion of a surface of the tubular composite part proximate the respective optical fiber. The plurality of optical fibers of an example embodiment extend outward from the end point adapter such that the optical fibers that extend outward from one portion of the end point adapter have a greater density than the optical fibers that extend outward from another portion of the end point adapter.

The NIR imaging spectrometer of an example embodiment includes an input slit. The system of this example embodiment also includes a sensor adapter configured to terminate the plurality of optical fibers such that the end portions of the optical fibers are disposed at the input slit of the NIR imaging spectrometer. The system of an example embodiment also includes an encoder carried by the end point adapter and configured to provide positional information from which the longitudinal position of the end point adapter within the tubular composite part is determinable.

The system of an example embodiment also includes a plurality of input optical fibers configured to move with the end point adapter through the tubular composite part. The plurality of input optical fibers are also configured to provide light in order to illuminate an internal surface of the tubular composite part. The system of an alternative example embodiment also includes a light emitting diode (LED) or an incandescent light source carried by the end point adapter and configured to illuminate the internal surface of the tubular composite part. The end point adapter of an example embodiment also includes one or more frames with a respective frame including three or more contact members for riding along an internal surface of the tubular composite part as the end point adapter is advanced longitudinally therethrough.

In another example embodiment, an end point adapter assembly of a near infrared (NIR) spectrometer is provided. The end point adapter assembly includes an end point adapter including two or more frames spaced apart from and connected to one another. At least two of the frames include three or more contact members configured to ride along an internal surface of a tubular composite part as the end point adapter is advanced therethrough. The end point adapter assembly of this example embodiment also includes a plurality of optical fibers extending radially outward from the end point adapter and configured to receive light following interaction of the light with the tubular composite part at each of a plurality of determinable longitudinal positions within the tubular composite part.

The end point adapter of an example embodiment includes at least three frames including first and second end frames and an intermediate frame disposed between the first and second end frames. The at least three frames are spaced apart in a longitudinal direction from and operably connected to one another. The plurality of optical fibers of this example embodiment extend outward from the intermediate frame. The end point adapter of an example embodiment is configured to be positioned within the tubular composite part such that a respective optical fiber is perpendicular to that portion of a surface of the tubular composite part proximate to the respective optical fiber. The plurality of optical fibers of an example embodiment extend outward from end point adapter such that the optical fibers that extend radially outward from one portion of the end point adapter have a greater density than the optical fibers that extend radially outward from another portion of the end point adapter.

The end point adapter assembly of an example embodiment also includes a plurality of input optical fibers configured to move with the end point adapter through the tubular composite part. The plurality of input optical fibers are also configured to provide light in order to illuminate an internal surface of the tubular composite part. The end point adapter assembly of an alternative example embodiment also includes a light emitting diode (LED) or an incandescent light source carried by the end point adapter and configured to illuminate an internal surface of the tubular composite part. The end point adapter assembly of an example embodiment also includes an encoder carried by the end point adapter and configured to provide positional information from which the longitudinal position of the end point adapter within the tubular composite part is determinable.

In a further example embodiment, a method is provided for internally inspecting a tubular composite part to identify and measure adhesive flow therewithin. The method of this example embodiment includes inserting an end point adapter into the tubular composite part and moving the end point adapter longitudinally through the tubular composite part while the end point adapter maintains a consistent cross-sectional position within the tubular composite part. The method of this example embodiment also includes illuminating an internal surface of the tubular composite part and receiving light with a plurality of optical fibers carried by the end point adapter following interaction of the light with the tubular composite part at each of a plurality of determinable longitudinal positions within the tubular composite part as the end point adapter is moved therethrough. The method of this example embodiment also includes dispersing the light being collected by each of the plurality of optical fibers across a near infrared (NIR) spectrum and generating images of the tubular composite part based on the light being collected by each of the plurality of optical fibers following dispersal across the NIR spectrum.

The method of an example embodiment illuminates the internal surface of the tubular composite part by providing light via a plurality of input optical fibers that move with the end point adapter through the tubular composite part. The method of an alternative example embodiment illuminates the internal surface of the tubular composite part by providing light with a light emitting diode (LED) or an incandescent light source carried by the end point adapter. In an example embodiment, the plurality of optical fibers extend radially outward from the end point adapter and the end point adapter is positioned within the tubular composite part such that a respective optical fiber is perpendicular to that portion of a surface of the tubular composite part proximate the respective optical fiber. The plurality of optical fibers of an example embodiment extend outward from the end point adapter such that the optical fibers that extend radially outward from one portion of the end point adapter have a greater density than the optical fibers that extend radially outward from another portion of the end point adapter.

BRIEF DESCRIPTION OF THE DRAWINGS

Having thus described certain example embodiments of the present disclosure in general terms, reference will hereinafter be made to the accompanying drawings which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A system and method are provided for internally inspecting a tubular composite part to identify and measure adhesive flow therewithin. The system and method of an example embodiment are configured to inspect a variety of different types of tubular composite parts including those having a relatively small cross-sectional area. By way of example, but not of limitation, the system and method will be described in conjunction with the inspection of a vent stringer of an aircraft and, more particularly, of an aircraft wing. As noted, however, the system and method are also capable of inspecting other types of tubular composite parts utilized in conjunction with a variety of other structures, such as structures other than aircraft. In this regard, the tubular composite part may have a variety of cross-sectional shapes including, for example, a circular cross-sectional shape, a rectangular cross-sectional shape, a trapezoidal cross-sectional shape, a parallelogram cross-sectional shape or the like.

Figure 1:
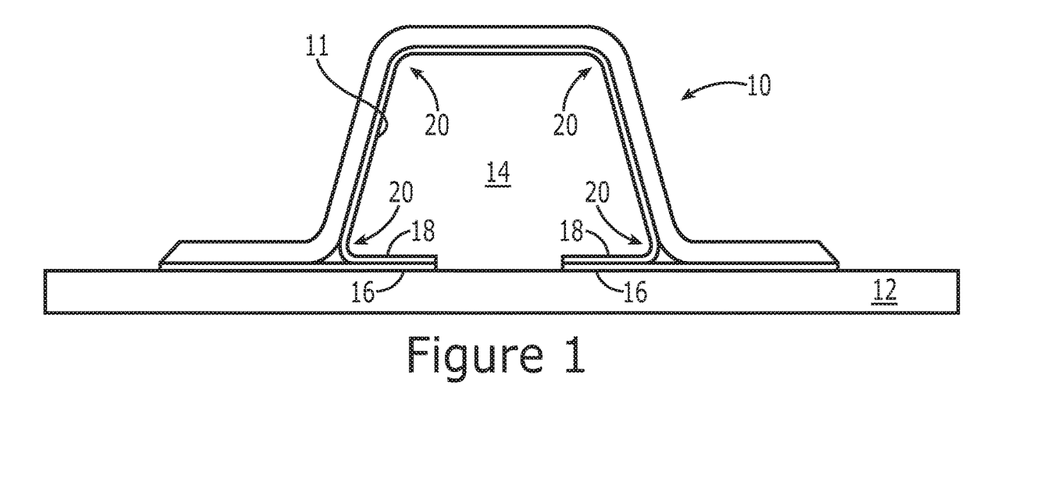
FIG. 1 is a perspective view of a vent stringer secured to skin with a film adhesive.

One example of a vent stringer 10 is depicted in FIG. 1. As shown, the vent stringer 10 is a tubular composite part and may be mounted upon an underlying structure 12, such as a wing skin, so as to define an elongate internal cavity 14. The vent stringer 10 of an example embodiment is formed of a composite material and is cured prior to being mounted upon the underlying structure 12. As shown in FIG. 1, the vent stringer 10 is secured to the underlying structure 12 with a film adhesive 16 that is positioned between attachment flanges 18 of the vent stringer and the underlying structure. In an example embodiment in which the vent stringer 10 is mounted upon a wing skin, the vent stringer is cured prior to being mounted upon the wing skin, but the wing skin is uncured. Thus, the assembly consisting of the wing skin, the vent stringer 10 and the film adhesive 16 positioned therebetween may be cured by placing the assembly within an autoclave that serves the cure both the wing skin and the film adhesive.

In some instances, adhesive may flow in to the internal cavity defined by the tubular composite part. With respect to the vent stringer 10 described above, a portion of the film adhesive 16 may flow in to the internal cavity 14 defined by the vent stringer. Although the adhesive may be located at a variety of different positions within the tubular composite part, some tubular composite parts, such as the vent stringer 10, include one or more corners 20 in which the adhesive may cool or otherwise form. As a result, resin pockets may form in one or more internal corners 20 of the tubular composite part. Resin pockets generally form during the initial cure of a composite part, such as the vent stringer 10, and are pure composite resin rather than a flow of excess adhesive. By utilizing an example embodiment of the present disclosure, resin pockets could be inspected prior to attaching the vent stringer 10 to the underlying structure 12, such as the wing skin.

Figure 2:
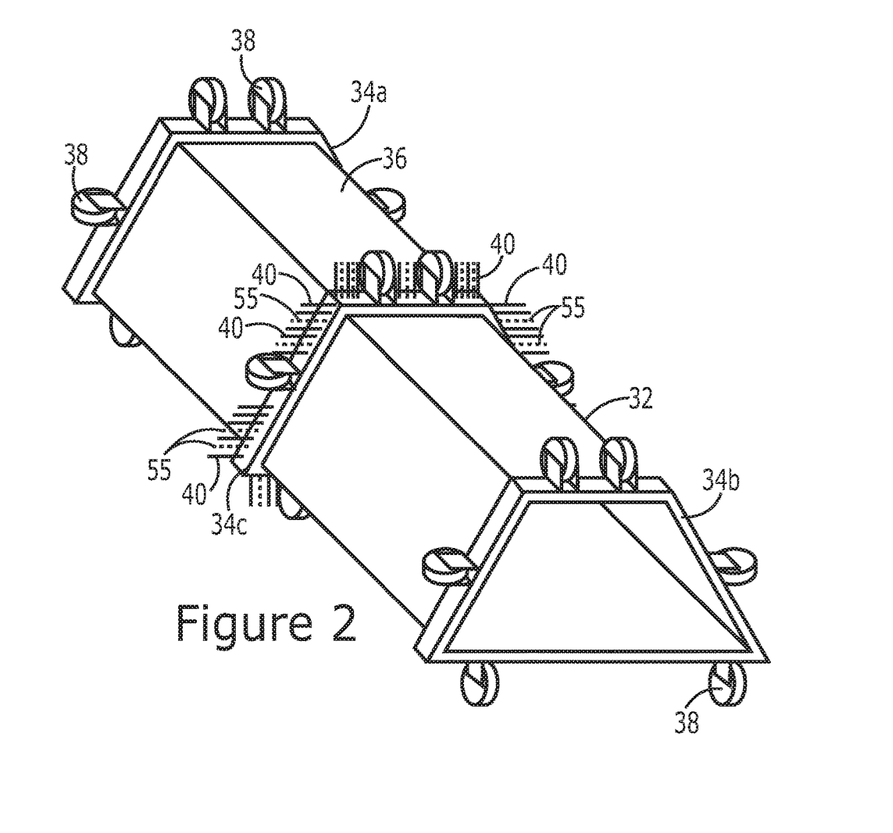
FIG. 2 is a perspective view of an endpoint adapter assembly in accordance with an example embodiment of the present disclosure.
Figure 3:
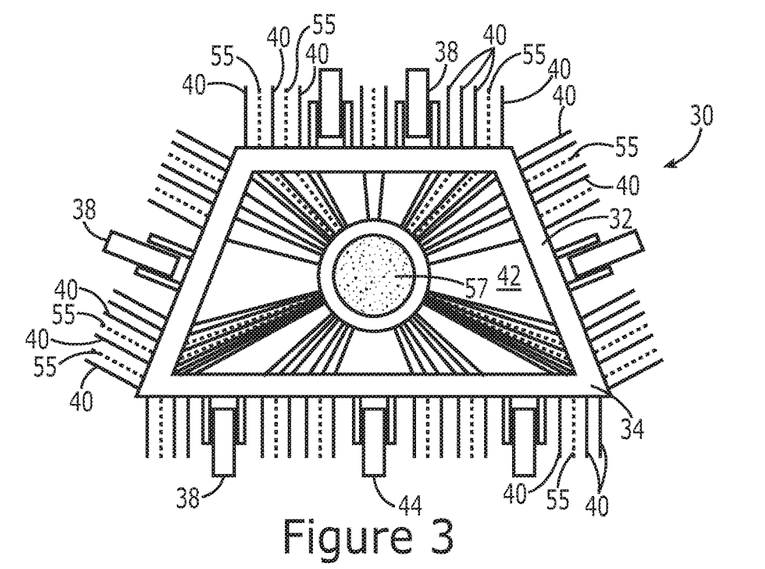
FIG. 3 is an end view of the intermediate frame of the endpoint adapter assembly of FIG. 2.

In order to permit the tubular composite part to be inspected so as to identify and measure the adhesive flow therewithin, a system 50 (which is described in more detail in FIG. 5) includes an endpoint adapter assembly 30 shown in FIG. 2. The endpoint adapter assembly 30 includes an endpoint adapter 32 configured to fit within and to maintain a consistent cross-sectional position within the tubular composite part. Although the endpoint adapter 32 may be configured in various manners, the endpoint adapter of an example embodiment is depicted in FIGS. 2 and 3. In this example embodiment, the endpoint adapter 32 includes two or more frames 34 spaced apart from and connected to one another. In the illustrated embodiment, for example, the endpoint adapter 32 includes three frames 34 spaced apart from and connected to one another. More particularly, the endpoint adapter 32 of FIGS. 2 and 3 includes first and second end frames 34a and 34b and an intermediate frame 34c disposed between the first and second end frames 34a and 34b. The three frames 34 are spaced apart in a longitudinal direction and are operably connected to one another. In the illustrated embodiment, the first and second end frames 34a and 34b are spaced equally from the intermediate frame 34c in opposite longitudinal directions. However, the frames 34 of the endpoint adapter 32 may be spaced apart from one another by different amounts in other embodiments. The frames 34 of the endpoint adapter 32 may also be connected to one another in various manners. In the illustrated embodiment, the endpoint adapter 32 includes a housing 36, such as a rigid sleeve-like housing, that interconnects the frames 34. However, the frames 34 may be connected in other manners including, for example, by one or more longitudinally extending supports or ribs that extend between a pair of frames and serve to connect the pair of frames.

The endpoint adapter 32 also includes contact members 38, such as three or more contact members, for riding along an internal surface of the tubular composite part as the endpoint adapter is advanced longitudinally therethrough as described below. The contact members 38 of an example embodiment are mounted on and carried by one or more of the frames 34. For example, at least the first and second end frames 34a and 34b and, in the illustrated embodiment, each frame 34 includes a plurality of contact members 38 for riding along the internal surface of the tubular composite part and for maintaining a consistent cross-sectional position of the endpoint adapter therewithin. The endpoint adapter 32 may include a variety of different types of contact members 38 including, for example, wheels, slides, skis or the like.

The endpoint adapter assembly 30 also includes a plurality of output optical fibers 40 extending radially outward from the endpoint adapter 32. The endpoint adapter assembly 30 may include any number of output optical fibers 40, but the endpoint adapter assembly of an example embodiment includes between 50 and 150 output optical fibers. In the embodiment of FIGS. 2 and 3, the output optical fibers 40 extend from within an interior cavity 42 defined by the endpoint adapter 32 through the intermediate frame in a radially outward direction. In order to permit the various internal surfaces of a tubular composite part to be inspected, the endpoint adapter assembly 30 of an example embodiment includes output optical fibers 40 that extend radially outward in a number of different directions. In one embodiment, for example, the plurality of output optical fibers 40 extend radially outward in a plurality of different directions that are offset by equal angular increments from one another. As such, each output optical fiber 40 of this example embodiment is offset by a predefined angular increment, such as 5°, from the neighboring output optical fibers. Thus, relative to a reference point on the endpoint adapter 32 that is designated to be 0°, such as a reference point that is centered along the upper portion of the endpoint adapter, e.g., at 12 o'clock, the plurality of output optical fibers 40 of this example embodiment will extend at 5°, 10°, 15°, 20°, . . . 345°, 350°, 355° and 360°.

In other embodiments, however, the plurality of output optical fibers 40 that extend radially outward are not evenly angularly distributed, but are, instead, selectively positioned so as to have different densities in different directions. For example, the output optical fibers 40 may be clustered so as to have an increased density proximate those regions of the tubular composite part that are most susceptible to the accumulation of adhesive, such as corners 20, joints or other part-specific features. Since resin pockets are more likely to form in the corners 20 of a tubular composite part, the endpoint adapter assembly 30 of an example embodiment includes an increased density of output optical fibers 40 proximate the corners and a lower density of output optical fibers proximate other portions of the tubular composite part that are less likely to accumulate adhesive.

Figure 4:
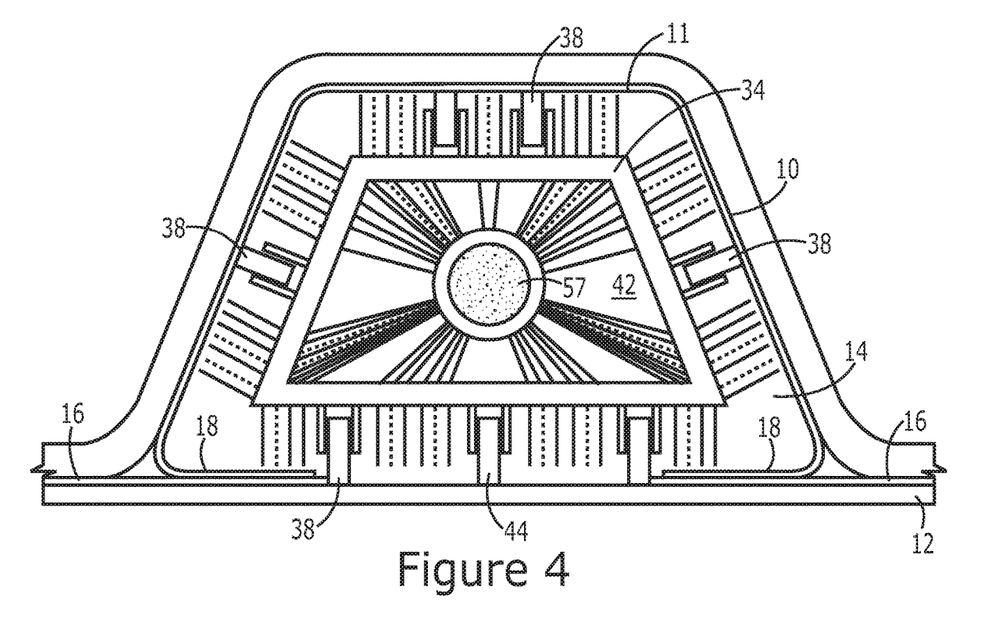
FIG. 4 is a cross-sectional view of the endpoint adapter assembly of FIG. 2 disposed within the vent stringer of FIG. 1 in accordance with an example embodiment of the present disclosure.

The endpoint adapter assembly 30 is configured to be moved longitudinally through the tubular composite part in order to identify and measure adhesive flow therewithin. In this regard, FIG. 4 depicts the endpoint adapter assembly 30 of FIGS. 2 and 3 inserted within the vent stringer 10 of FIG. 1. As shown, the endpoint adapter assembly 30 fits snugly within the tubular composite part with the contact members 38 riding upon the internal surface of the tubular composite part, such as, for example, an internal surface 11 of the vent stringer 10, so as to maintain the endpoint adapter 32 including the plurality of output optical fibers 40 in a consistent relative position with respect to the internal surface of the tubular composite part. Once inserted, the endpoint adapter assembly 30 may be moved through the tubular composite part in various manners. For example, the endpoint adapter assembly 30 may include a crawler, that is, a relatively slow moving propulsive device, configured to move the endpoint adapter assembly longitudinally through the tubular composite part at a predefined rate. Alternatively, the endpoint adapter assembly 30 may be engaged by a rod or other type of force member to permit a technician to push the endpoint adapter assembly through the tubular composite part.

Figure 5:
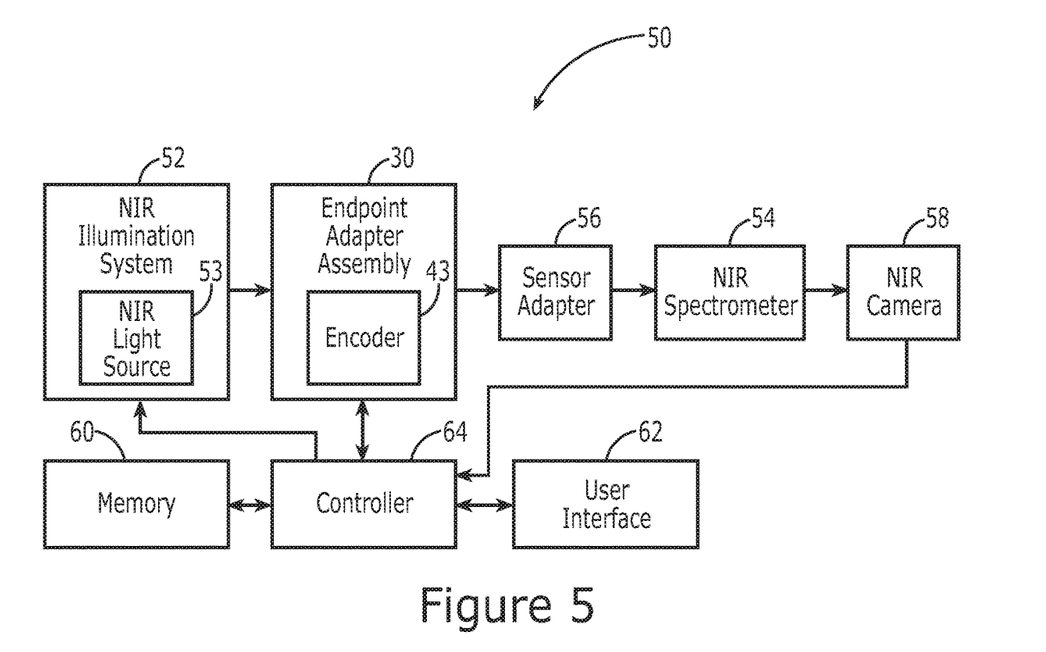
FIG. 5 is a block diagram of a system for internally inspecting a tubular composite part to identify and measure adhesive flow therewithin in accordance with an example embodiment of the present disclosure.

While the endpoint adapter assembly 30 is advanced longitudinally through the tubular composite part, the interior surface of the tubular composite part is illuminated with near infrared (NIR) light from the NIR spectrum, which extends from 750 nanometers to 2500 nanometers and, more particularly with respect to the detection of adhesive or resin pockets, to 900 nanometers to 1700 nanometers. As shown in FIG. 5, the system 50 for internally inspecting a tubular composite part of an example embodiment not only includes the endpoint adapter assembly 30, but also includes a NIR illumination system 52. The NIR illumination system 52 includes, in one embodiment, an NIR light source 53, such as one or more NIR lasers, such as one or more light emitting diodes (LEDs) having center frequencies within the NIR spectrum, or an incandescent light source. The NIR light source 53 may be carried by the endpoint adapter 30, such as by being disposed within the interior cavity 42 of the endpoint adapter, and directed so as to illuminate the interior surface of the tubular composite part. Alternatively, the NIR light source 53, such as one or more NIR lasers or the incandescent light source, may be positioned outside of the tubular composite part. In this alternative embodiment, the NIR illumination system 52 also includes a plurality of input optical fibers 55 shown in FIGS. 2 and 3, that extend between the NIR light source 53 and the endpoint adapter 32. The plurality of input optical fibers 55 are configured to move with the endpoint adapter 32 through the internal cavity 14 within the tubular composite part. In this regard, the plurality of input optical fibers 55 include first end portions that are secured to the endpoint adapter 32. The first end portions of the plurality of input optical fibers 55 are directed such that the NIR light emitted by the NIR light source 53 propagates through the plurality of input optical fibers 55 and illuminates the internal surface of the tubular composite part. The plurality of input optical fibers 55 of this example embodiment extend from their first end portions secured to the endpoint adapter 32, through the tubular composite part to their opposed second end portions that are generally positioned outside of the tubular composite part. In this regard, the second end portions of the input optical fibers 55 that are disposed outside of the tubular composite part are in optical communication with the NIR light source 53. Thus, NIR light signals provided by the NIR light source 53 propagate through the plurality of input optical fibers 55 and are emitted by the first end portions of the input optical fibers so as to illuminate the internal surface of the tubular composite part. In this embodiment, the plurality of input optical fibers 55 may be bundled, either with the plurality of output optical fibers 40 as shown by bundle 57 in FIGS. 3 and 4 or separately from the plurality of output optical fibers, such that the plurality of input optical fibers have sufficient strength that the motive force required to advance the endpoint adapter assembly 30 longitudinally through the tubular composite part may be provided by pushing the plurality of input optical fibers through the tubular composite part which, in turn, correspondingly longitudinally advances the endpoint adapter assembly which carries the first end portions of the input optical fibers.

Upon activation, the NIR illumination system 52 of this example embodiment illuminates the internal surface of the tubular composite part. Regardless of the location of the NIR light source 53, the NIR light signals may be directed at an angle, such as 45°, onto the internal surface of the tubular composite part to facilitate inspection of the internal surface as described below.

Following interaction of the NIR light with the tubular composite part, the plurality of output optical fibers 40 that extend radially outward from the endpoint adapter 32 receive the NIR light for a respective longitudinal position within the tubular composite part. In an embodiment in which the NIR light signals are directed at an angle, such as 45°, onto the internal surface of the tubular composite part, the NIR light that is collected by the output optical fibers is diffuse, as opposed to being the product of specular reflection, which facilitates the interrogation of the tubular composite part. As a result of the different radially outward directions in which the output optical fibers 40 extend, the plurality of output optical fibers receive NIR light following its interaction with different circumferential portions of the internal surface of the tubular composite part, such as different portions of the internal surface of the tubular composite part located at different angular positions relative to a reference position. For example, in an embodiment in which the plurality of output optical fibers 40 extend radially outward at equal angular increments, a first output optical fiber may receive NIR light following interaction with that portion of the internal surface of a tubular composite part at 0° relative to a reference point, a second output optical fiber may receive NIR light following interaction with that portion of the internal surface of a tubular composite part at 5° relative to the reference point, a third output optical fiber may receive NIR light following interaction with that portion of the internal surface of a tubular composite part at 10° relative to the reference point and so on.

As noted above, the endpoint adapter assembly 30 is configured to be advanced longitudinally through the tubular composite part. Thus, the illumination of the internal surface of the tubular composite part and the receipt of NIR light by the plurality of output optical fibers 40 following the interaction of the light with the internal surface of the tubular composite part may be repeated at a plurality of different longitudinal positions within the tubular composite part. In this regard, this inspection process may be repeated continuously as the endpoint adapter assembly 30 is advanced through the tubular composite part or at a predetermined frequency as the endpoint adapter assembly is advanced through the tubular composite part such that a predefined step size is defined between adjacent longitudinal positions at which the tubular composite part is inspected. At each longitudinal position, a plurality of different circumferential portions of the interior surface of the tubular composite part are inspected with each output optical fiber 40 receiving NIR light following its interaction with a respective portion of the interior surface of the tubular composite part.

In order to facilitate the reception of NIR light by the plurality of output optical fibers 40 following the interaction of light with the internal surface of the tubular composite part, the plurality of output optical fibers of an example embodiment are configured to extend outwardly from the endpoint adapter 32 and the endpoint adapter is configured to be positioned within the tubular composite part such that a respective output optical fiber and, more typically, each output optical fiber is perpendicular to that portion of the internal surface of the tubular composite part proximate the respective output optical fiber. In other words, for a respective output optical fiber, the longitudinal axis extending lengthwise through the output optical fiber is perpendicular to the portion of the internal surface of the tubular composite part that is closest to and in alignment with the respective output optical fiber. The end portions of the output optical fibers 40 are generally close and, in some embodiments, touching the interior surface of the tubular composite part. For example, the end portions of the output optical fibers 40 of one embodiment are positioned within 5 mm of the interior surface of the tubular composite part.

The position of the endpoint adapter assembly 30 and, more particularly, the plurality of output optical fibers 40 that extend radially outward from the endpoint adapter 32, is determined and is maintained in association with the results of the inspection. The position of the endpoint adapter assembly 30 within the tubular composite part may be determined in various manners. For example, in embodiments in which the endpoint adapter assembly 30 is pushed through the tubular composite part by a rod or other force member, the length of the rod or other force member that is inserted in to the tubular composite part provides a measure of the longitudinal position of the endpoint adapter assembly within the tubular composite part. Similarly, in the example embodiment in which the NIR light is delivered by a plurality of input optical fibers 55 that extend from the endpoint adapter assembly 30 through the tubular composite part, the length of the plurality of input optical fibers that extend through the internal cavity 14 within the tubular composite part provides a measure of the longitudinal position of the endpoint adapter assembly within the tubular composite part.

Alternatively, the endpoint adapter assembly 30 may include an encoder 43 carried by the endpoint adapter 32 and configured to provide positional information from which the longitudinal position of the endpoint adapter within the tubular composite part is determinable. Although the encoder 43 may be configured in various manners, the encoder of an example embodiment includes a wheel 44 carried by the endpoint adapter 32 and configured to rotate as a result of its engagement with the internal surface of the tubular composite part as the endpoint adapter assembly 30 is advanced therethrough. By tracking the rotation of the wheel 44 as the endpoint adapter assembly 30 is advanced longitudinally through the tubular composite part, a measure of the longitudinal position of the endpoint adapter assembly within the tubular composite part is provided. Thus, the endpoint adapter assembly 30 of this example embodiment also includes a sensing mechanism, such as an optical, electrical or mechanical sensor, configured to count the number of rotations of the wheel 44 in order to provide a measure of the longitudinal position of the endpoint adapter assembly within the tubular composite part.

As shown in FIG. 5, the system 50 of an example embodiment also includes a near infrared (NIR) imaging spectrometer 54 configured to disperse, for each respective output optical fiber 40, the NIR light being collected by the respective output optical fiber across the NIR spectrum. The NIR light collected by a respective output optical fiber 40 is indicative of the interaction of the light with a respective portion of the internal surface of the tubular composite part. However, the NIR light collected by a respective output optical fiber 40 includes light having wavelengths across the NIR spectrum with the light, such as the intensity of the light, collected at each wavelength providing information regarding the internal surface of the tubular composite part at the respective location. In this regard, the interaction of NIR light with different types of adhesive or resin (hereinafter collectively referenced as adhesive) creates a distinctive signature in terms of the relative intensity of the light that returns and is collected at each of the different wavelengths across the NIR spectrum such that an analysis of the relative intensity of the returning light at different wavelengths across the NIR spectrum permits the presence of adhesive to be identified. Additionally, the overall intensity of the light that returns and is collected at each of the different wavelengths across the NIR spectrum provides a measure of the thickness of the adhesive identified within the tubular composite part.

Figure 6:
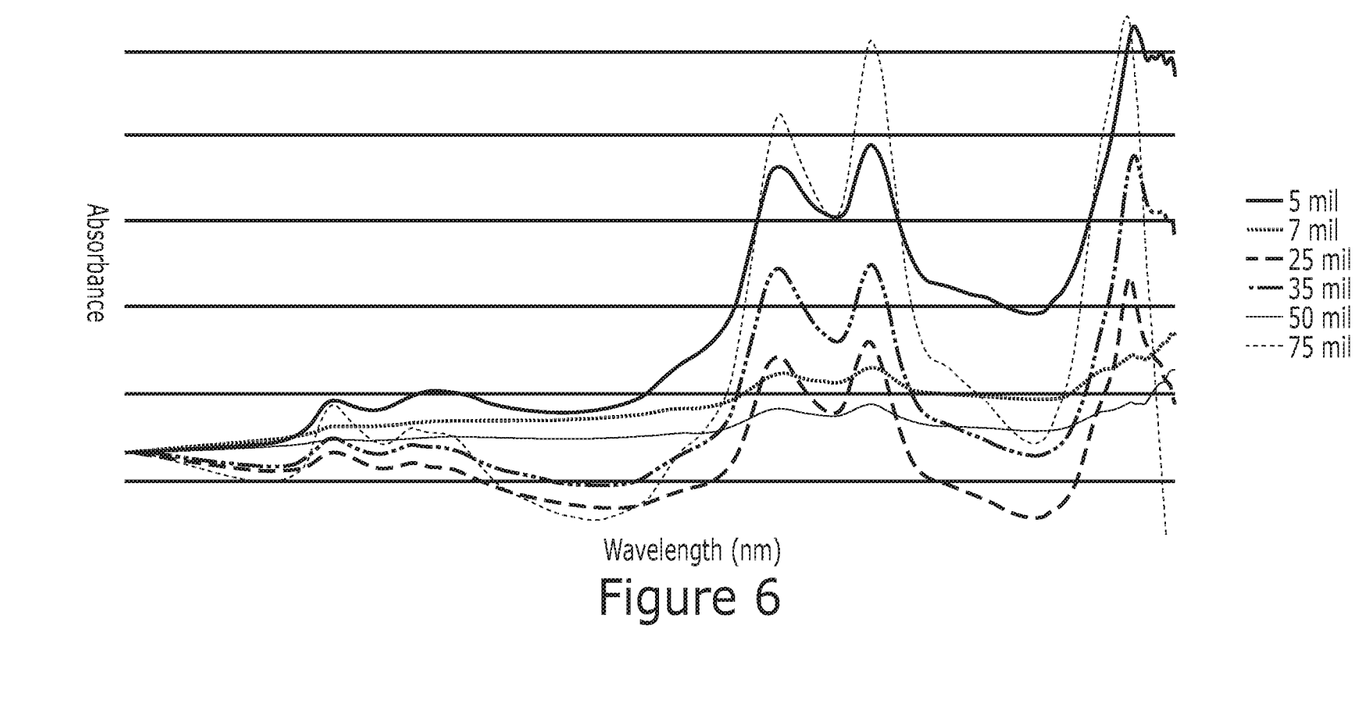
FIG. 6 is a graphical representation of the absorbance of adhesive of different depths.

In regards to the anticipated signature of different types of adhesive and the intensity of the light collected following interaction with different depths of adhesive, a calibration process may be employed relative to the same type of tubular composite part prior to utilization of the method and system 50 in order to define the to the anticipated signature of different types of adhesive and the intensity of the light collected following interaction with different depths of adhesive. For example, FIG. 6 depicts the absorbance of adhesive of different depth ranging from 5 mils to 75 mils from which the signature of the adhesive of different depths in terms of the intensity of the light that returns and is collected at each of the different wavelengths across the NIR spectrum is determinable (since the NIR light that is not absorbed by the resin returns and is collected by the output optical fibers 40 so as to define the signature of the adhesive).

Figure 7:
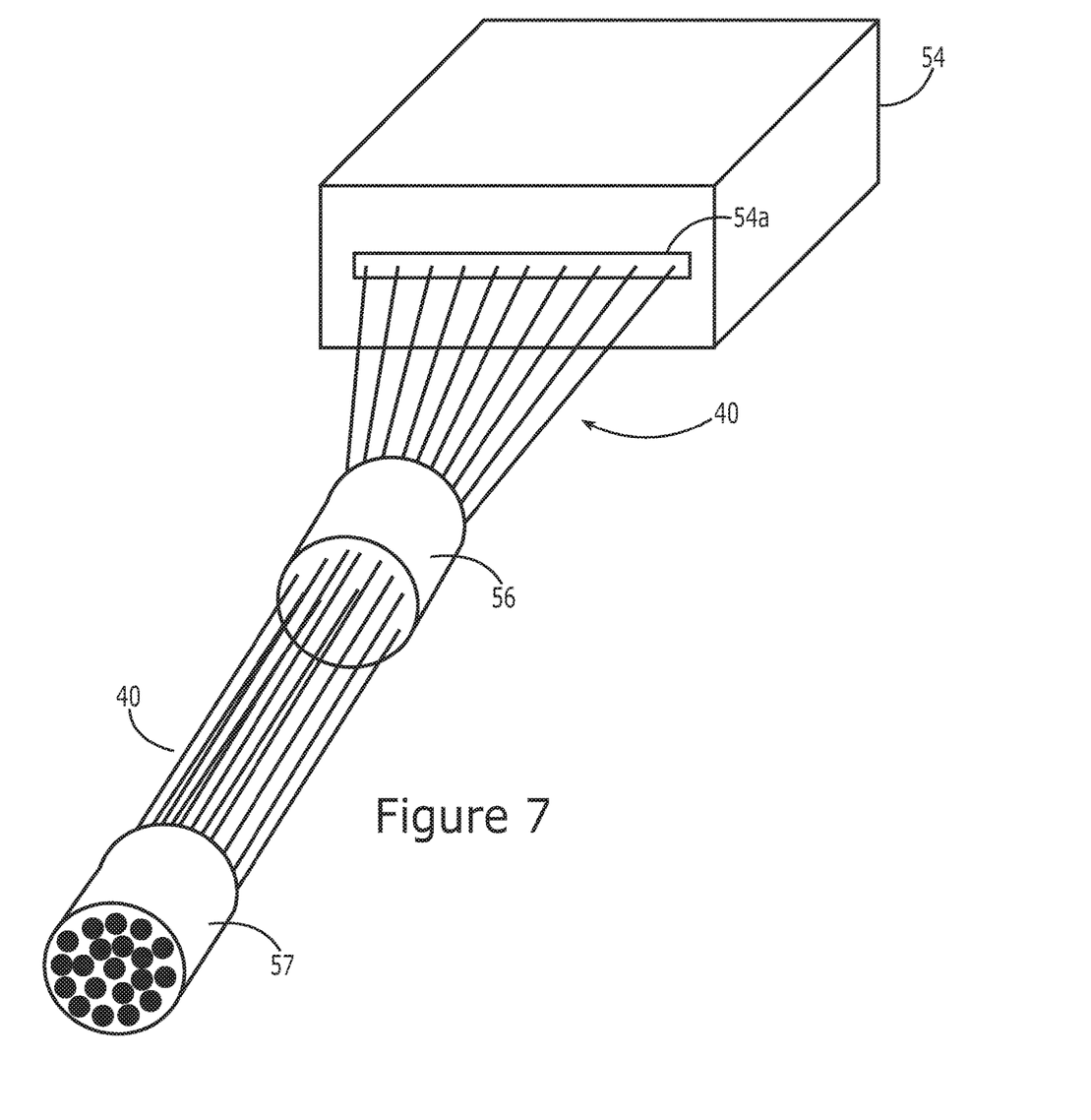
FIG. 7 illustrates the manner in which the output optical fibers are provided to a slit defined by a near infrared spectrometer in accordance with an example embodiment of the present disclosure.

In an example embodiment depicted in FIG. 7, the NIR imaging spectrometer 54 includes an input slit 54*a*. In this example embodiment, the system 50 also includes a sensor adapter 56 configured to terminate the plurality of output optical fibers 40, such as the ends of the plurality of output optical fibers that are opposite the ends of the output optical fibers that collect the NIR light following interaction with the internal surface of the tubular composite part. The sensor adapter 56 of an example embodiment is configured to terminate the plurality of output optical fibers 40 with the end portions of the output optical fibers disposed at the input slit 54*a* of the NIR imaging spectrometer 54 such that the light collected by each of the plurality of output optical fibers is dispersed across the NIR spectrum.

The NIR imaging spectrometer 54 of an example embodiment is positioned outside of the tubular composite part. Thus, the plurality of output optical fibers 40 of this embodiment extend, such as in bundle 57, from the endpoint adapter assembly 30, through the internal cavity 14 of the tubular composite part to the sensor adapter 56 of the NIR image spectrometer 54 outside of the tubular composite part.

The system 50 of this example embodiment also includes a NIR camera 58 configured to generate images of the NIR light being collected by each of the plurality of output optical fibers 40 following its dispersal across the NIR spectrum. The NIR camera 58 includes a plurality of NIR sensors to record the incoming pattern of NIR radiation provided by the plurality of output optical fibers 40. Each sensor returns and electrical current when the sensor is illuminated by the incoming light from a respective output optical fiber 40. The NIR camera 58 then utilizes the electrical current generated by the sensors to generate the images.

For example, the NIR camera 58 may be configured to generate an image at each longitudinal position within the tubular composite part at which interior surface of the tubular composite part is illuminated and the returning NIR light is collected by the plurality of output optical fibers 40. The image generated by the NIR camera 58 includes the light collected by each of the plurality of output optical fibers 40 following its dispersal across the NIR spectrum. In this example embodiment, each image generated by the NIR camera 58 may be associated with the longitudinal position within the tubular composite part at which the interior surface of the tubular composite part was inspected, such as based upon positional information provided by the encoder 43. Based upon the images generated by the NIR camera 58, adhesive flow within the tubular composite part may be identified as described above and measured, such as by determining one or more quantitative measures including area, width, length and depth of the adhesive flow. As a result, a determination can be made as to whether remedial action should be taken in order to remove or reduce the adhesive flow within the tubular composite part or whether the adhesive flow is immaterial with respect to subsequent performance of a structure including the tubular composite part.

Figure 8:
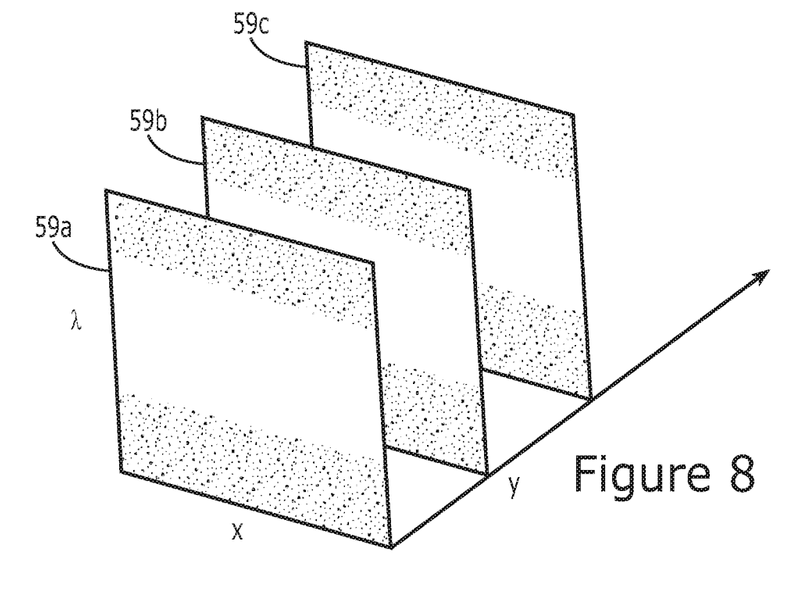
FIG. 8 is a representation of the different spectra of near infrared light that are received at different longitudinal positions within a tubular composite part in accordance with an example embodiment of the present disclosure.

As shown in FIG. 8, the NIR camera 58 is configured to generate images at each of a plurality of longitudinal positions within the tubular composite part—three of which designated 59*a*, 59*b* and 59*c* are shown for purposes of illustration but not of limitation. As shown, the images are captured at different longitudinal positions y along the tubular composite part. In addition, each image includes the NIR spectrum (designated λ) collected by each of the plurality of optical fibers (designated x). The images generated by the NIR camera 58 may be stored by a memory device 60 of the system 50 and/or presented by a user interface 62, such as a display, of the system, as shown in FIG. 5. Although the memory device 60 may be configured in various manners, the memory device may include, for example, volatile and/or non-volatile memory. The memory device 60 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory device 60 may comprise any non-transitory computer readable storage medium. The memory device 60 may be configured to store information, data, applications, instructions, or the like for enabling the system 50 to carry out various functions in accordance with example embodiments of the present disclosure.

By analyzing the images generated by the NIR camera 58 at each of a plurality of consecutive longitudinal positions within the tubular composite part and, more particular, the contribution provided to the images generated by the NIR camera by a respective output optical fiber 40 to determine if the light is indicative of the presence of adhesive, the length (in the longitudinal direction of the tubular composite part) of adhesive that is identified (based on a correlation between the signature of the adhesive and the NIR spectrum of the light collected by the output optical fibers 40) may be determined. Additionally, by analyzing the contributions provided to a respective image generated by the NIR camera 58 by the light collected by neighboring output optical fibers 40 to determine if the light is indicative of the presence of adhesive, the width (in the circumferential direction of the tubular composite part) of adhesive that is identified may be determined. Based on the length and the width, the area of adhesive identified within a tubular composite part may be identified. Moreover, the depth of adhesive identified within a tubular composite part may also be determined based upon the overall intensity of the light collected by the output optical fibers 40 and imaged by the NIR imaging spectrometer 54 and the NIR camera 58.

The images generated by the NIR camera 58 may be analyzed in various manners including implementation of various automated or manual analysis techniques. In the embodiment of the system 50 depicted in FIG. 5, the system also includes a controller 64. Among other functions, the controller 64 is configured to receive the images, or the raw data representative of the images, generated by the NIR camera 58 and to identify and quantify adhesive within the tubular composite part, such as by determining the length, width, area and/or depth of adhesive as described above. The controller 64 of this example embodiment is also configured to receive position information from the encoder 43 and to associate the location defined by the position information with the respective image captured at the respective location. In addition, in embodiments in which the advancement of the endpoint adapter assembly 30 through the tubular composite part is automated, such as in instances in which the motive force for the endpoint adapter assembly is provided by a crawler or is otherwise automated, the controller 64 may be further configured to provide instructions directing and controlling the longitudinal advancement of the endpoint adapter assembly through the tubular composite part.

Although the controller 64 may be configured in various manners, the controller of an example embodiment may be embodied as one or more microprocessors, one or more coprocessors, one or more multi-core processors, one or more computers, various other processing elements including integrated circuits such as, for example, an ASIC (application specific integrated circuit) or FPGA (field programmable gate array), or some combination thereof. In some example embodiments, the controller 64 is configured to execute instructions stored by the memory device 60 or otherwise accessible to the controller. These instructions, when executed by the controller 64, may cause one or more of the functionalities described herein to be performed. As such, the controller 64 and the memory 60 may comprise an entity capable of performing operations according to embodiments of the present disclosure while configured accordingly. Thus, for example, when the controller 64 is embodied as an ASIC, FPGA or the like, the controller and the memory device 60 may comprise specifically configured hardware for conducting one or more operations described herein. Alternatively, as another example, when the controller 64 is embodied as an executor of instructions, such as may be stored in the memory device 60, the instructions may specifically configure the controller to perform one or more algorithms and operations described herein.

Figure 9:
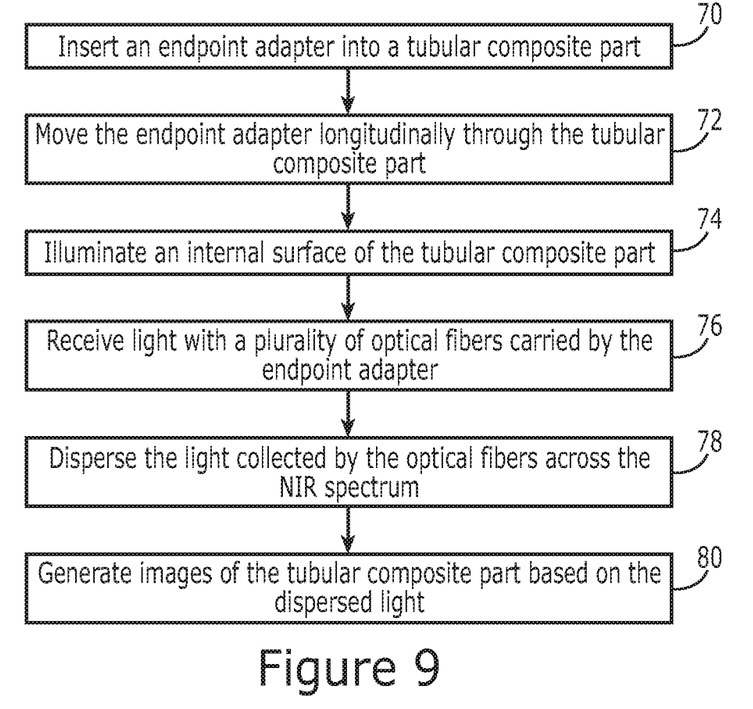
FIG. 9 is a flowchart illustrating operations performed, such as by the system of FIG. 5, in accordance with an example embodiment of the present disclosure.

As described, the system 50 of an example embodiment is configured to internally inspect a tubular composite part so as to identify and measure adhesive flow therewithin. As shown in block 70 of FIG. 9, the internal inspection of a tubular composite part begins with the insertion of an endpoint adapter 32 into the tubular composite part. The endpoint adapter 32 is then moved longitudinally through the tubular composite part while the endpoint adapter maintains a consistent cross-sectional position within the tubular composite part. See block 72. The internal surface of the tubular composite part is then illuminated. See block 74. As described above, the internal surface of the tubular composite part may be illuminated in various manners including by providing light via a plurality of input optical fibers 55 that move with the endpoint adapter 32 through the tubular composite part or by providing light with an NIR light source 53, such as one or more light emitting diodes or an incandescent light source, carried by the endpoint adapter. Light is then received with a plurality of output optical fibers 40 carried by the endpoint adapter 32 following interaction of the light with the tubular composite part at each of a plurality of determinable longitudinal positions within the tubular composite part as the endpoint adapter is moved therethrough. See block 76. Thus, at each longitudinal position as determined, for example, by an encoder 43, different circumferential portions of the internal surface of the tubular composite part are illuminated and light is collected by the plurality of output optical fibers 40 following interaction therewith. Moreover, this process of illuminating different circumferential portions of the internal surface of the tubular composite part and collecting the light that returns following interaction therewith is repeated at a plurality of longitudinal positions along the length of the tubular composite part.

At each longitudinal position, the light collected by each of the plurality of output optical fibers 40 is dispersed, such as by an NIR spectrometer 54, across the NIR spectrum. See block 78 of FIG. 9. Images are then generated by an NIR camera 58 at each longitudinal position of the light collected by each of the plurality of output optical fibers 40 following dispersal across the NIR spectrum. See block 80. By analyzing the mages generated by the NIR camera 58, such as with the controller 64, adhesive within the tubular composite is identifiable. Adhesive flow within a tubular composite part is also measurable, such as by quantifying the adhesive in terms of length, width, area, depth or the like.

Figure 10A:
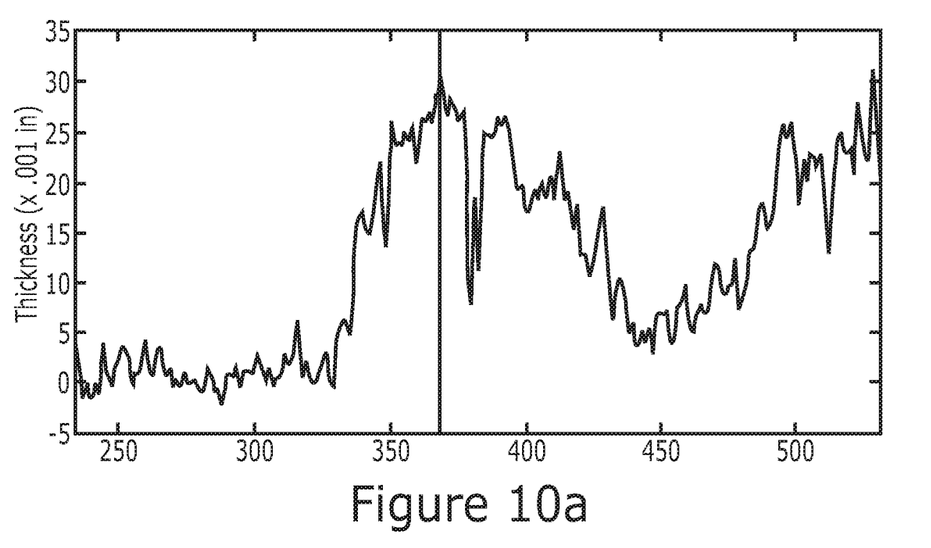
FIG. 10a is a graphical representation of the thickness of adhesive at different longitudinal positions within a tubular composite part in accordance with an example embodiment of the present disclosure.
Figure 10B:
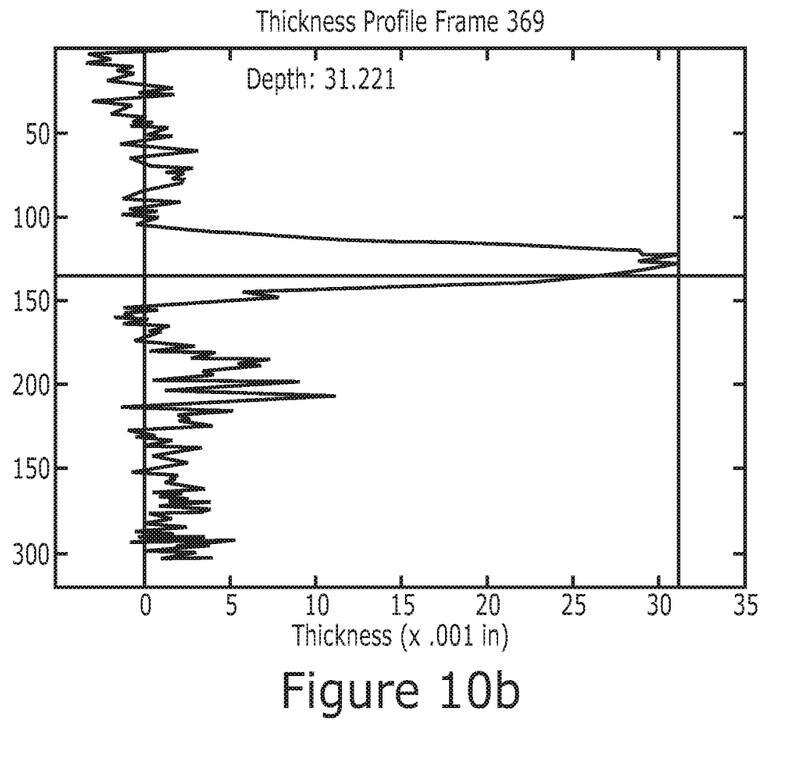
FIG. 10b is a graphical representation of the thickness of adhesive at different circumferential positions about the interior surface of a tubular composite part at a respective longitudinal position within a tubular composite part in accordance with an example embodiment of the present disclosure.
Figure 11:
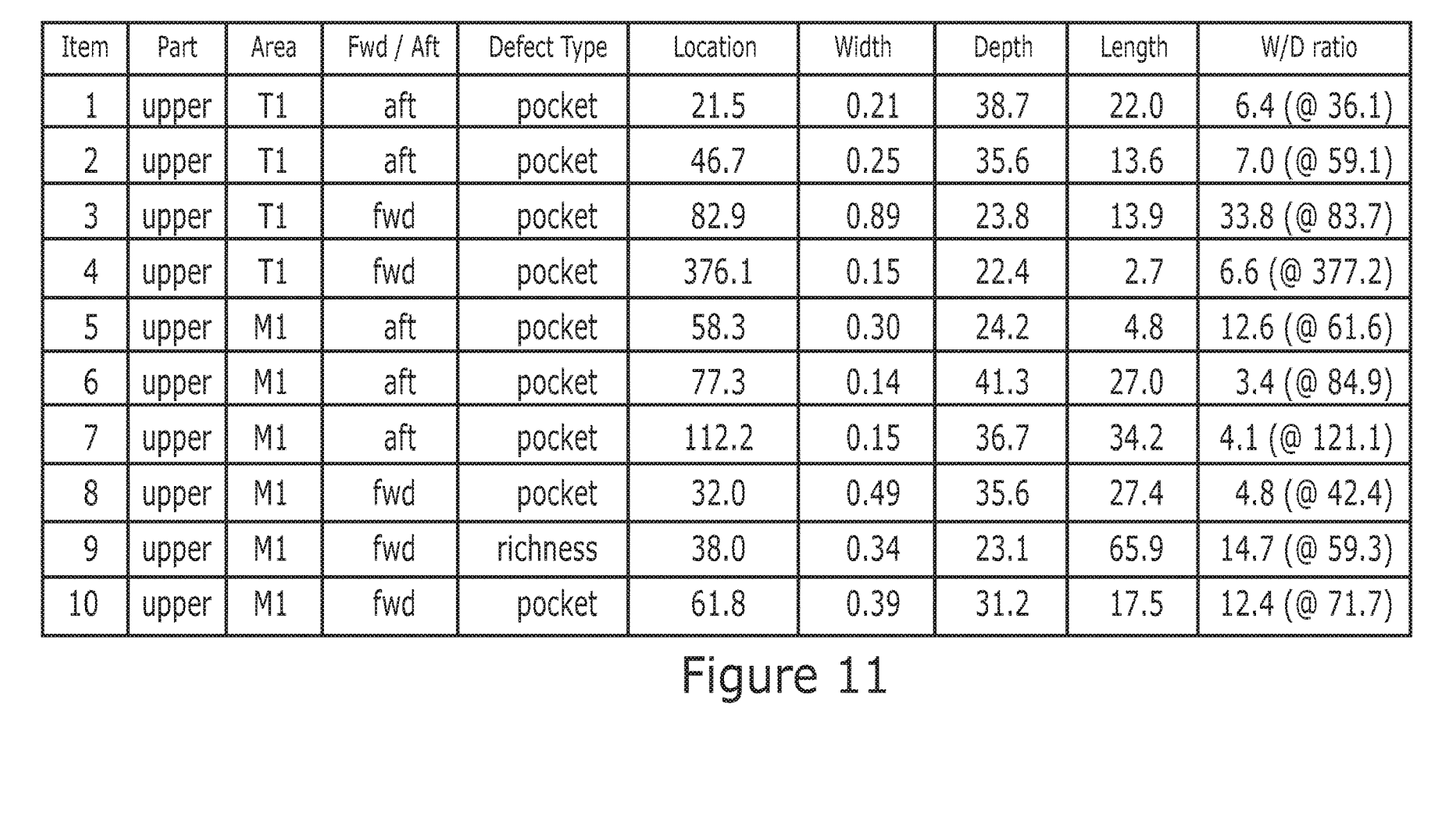
FIG. 11 is an example of a report that may be generated based upon the identification and measurement of the adhesive flow within a tubular composite part as provided by a system and method in accordance with an example embodiment of the present disclosure.

By way of example of the information that may be determined based upon an analysis of the images generated by the NIR camera 58, FIG. 10a depicts a thickness profile of adhesive in one corner of a tubular composite part. In this regard, the x-axis represents the frame number which, in turn, is representative of the longitudinal position within the tubular composite part from which the image was generated, while the y-axis represents the thickness in mils. As shown, the thickness of the adhesive various throughout the length of the tubular composite part from being relatively thin in from frames 230-330 and then being relatively thick from frames 350-420. The thickness of the adhesive at various circumferential positions about the interior surface of the tubular composite part at a respective longitudinal position may also be graphically represented as shown in FIG. 10b. For frame 369 as designated by the solid vertical line in FIG. 10a, the thickness in mils of the adhesive at various circumferential positions (designated 0-300 in FIG. 10b) about the interior surface of the tubular composite part is shown with the adhesive thickness peaking at 31,221 mils, FIG. 11 also illustrates a report that may be generated by the controller 64. The report lists those locations within the tubular composite part at which the adhesive exceeded a predefined threshold and, as such merits further investigation. As such, the report generally identifies the part in terms of part name, area and forward/aft. The defect type is also identified as well as various parameters determined for the adhesive, such as location (such as in terms of a length in inches along the tubular composite part from the opening at one end thereof), width (in inches), depth (in mils), length (in inches) and width-to-depth (W/D) ratio at a respective location. Additionally, those resin pockets having a depth that exceeds a predefined threshold, such as 30 mils, may be highlighted or otherwise flagged to facilitate their further consideration.

By inspecting the interior of a tubular composite part in this manner, adhesive therewithin may be reliably identified and quantified, such as by determining the depth such as the depth of a resin pocket, as well as the surface area as defined by the length and the width of the adhesive. Based upon a quantification of the adhesive identified within the tubular composite part, an educated determination may be made as to whether remedial action should be taken to reduce or eliminate the adhesive that has been identified based both upon the size and extent of the adhesive as well as the location of the adhesive within the tubular composite part. As a result, the resulting structure including the tubular composite part may thereafter perform in a more reliable manner and with greater confidence.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A system for internally inspecting a tubular composite part to identify and measure adhesive flow therewithin; the system comprising:
   an endpoint adapter configured to fit within and to maintain a consistent cross-sectional position within the tubular composite part, wherein the endpoint adapter comprises one or more frames with a respective frame comprising three or more contact members for riding along an internal surface while in contact with the internal surface of the tubular composite part as the endpoint adapter is advanced longitudinally therethrough;
   a plurality of optical fibers extending radially outward from the endpoint adapter, wherein said endpoint adapter is configured to be moved longitudinally through the tubular composite part so as to receive light with the plurality of optical fibers following interaction of the light with the tubular composite part at each of a plurality of determinable longitudinal positions within the tubular composite part, wherein the plurality of optical fibers extend in a consistent relative position with respect to the internal surface of the tubular composite part, wherein the plurality of optical fibers extending radially outward from the endpoint adapter have an increased density proximate regions of the tubular composite part having a relatively higher susceptibility to accumulation of adhesive than other regions of the tubular composite part;
   a near infrared (NIR) imaging spectrometer configured to disperse the light being collected by each of the plurality of optical fibers across an NIR spectrum; and
   a NIR camera configured to generate images of the tubular composite part based on light being collected by each of the plurality of optical fibers following dispersal across the NIR spectrum.

2. A system according to claim 1 wherein the plurality of optical fibers extend outward from the endpoint adapter such that the optical fibers that extend radially outward from one portion of the endpoint adapter have a greater density than the optical fibers that extend radially outward from another portion of the endpoint adapter.

3. A system according to claim 1 wherein the NIR imaging spectrometer comprises a input slit, and wherein the system further comprises a sensor adapter configured to terminate the plurality of optical fibers such that end portions of the optical fibers are disposed at the input slit of the NIR imaging spectrometer.

4. A system according to claim 1 further comprising a plurality of input optical fibers configured to move with the endpoint adapter through the tubular composite part, wherein the plurality of input optical fibers are also configured to provide near-infrared light of a wavelength from about 750 nanometers to about 2500 nanometers in order to illuminate an internal surface of the tubular composite part.

5. A system according to claim 1 further comprising an encoder carried by the endpoint adapter and configured to provide positional information from which the longitudinal position of the endpoint adapter within the tubular composite part is determinable.

6. A system according to claim 1, wherein the regions of the tubular composite part having a relatively higher susceptibility to the accumulation of adhesive comprise corners or joints of the tubular composite part.

7. A system according to claim 1, wherein the end adapter comprises at least three frames including a first end frame, a second end frame, and an intermediate frame disposed between the first end frame and the second end frame, wherein the at least three frames are spaced apart in a longitudinal direction from and operably connected to one another, and wherein the plurality of optical fibers extend radially outward from the intermediate frame.

8. A system according to claim 7, wherein the at least three frames are interconnected by longitudinally extending supports extending between the first end frame and the intermediate frame, and between the intermediate frame and the second end frame.

9. A system according to claim 1, wherein the plurality of optical fibersextend radially outward from the end point adapter to proximate the internal surface of the tubular composite part.

10. A system according to claim 9, wherein the plurality of optical fibersextend radially outward from the end point adapter to within five millimeters of the internal surface of the tubular composite part.

11. A system according to claim 1, wherein the plurality of optical fibers extend radially outward from the endpoint adapter in directions surrounding the endpoint adapter.

12. A system according to claim 1, wherein the system for inspecting a tubular composite part comprises a system for inspecting a polygonal tubular composite part.

13. An endpoint adapter assembly of a near infrared (NIR) spectrometer, the endpoint adapter assembly comprising:
   an endpoint adapter comprising at least three frames spaced apart in a longitudinal direction from and operably connected to one another, wherein the at least three frames comprise first and second end frames and an intermediate frame disposed between the first and second end frames, wherein at least two of the three frames comprise three or more contact members configured to ride along an internal surface of a tubular composite part as the endpoint adapter is advanced therethrough, wherein the endpoint adapter is configured to fit within and maintain a consistent cross sectional position within the tubular composite part; and
   a plurality of optical fibers extending radially outward from the endpoint adapter and configured to receive light following interaction of the light with the tubular composite part at each of a plurality of determinable longitudinal positions within the tubular composite part, wherein the plurality of optical fibers extend radially outward from the intermediate frame, wherein the plurality of optical fibers extend in a consistent relative position with respect to the internal surface of the tubular composite part.

14. An endpoint adapter assembly according to claim 13 wherein the plurality of optical fibers extend outward from the endpoint adapter such that the optical fibers that extend radially outward from one portion of the endpoint adapter have a greater density than the optical fibers that extend radially outward from another portion of the endpoint adapter.

15. An endpoint adapter assembly according to claim 13 further comprising an encoder carried by the endpoint adapter and configured to provide positional information from which the longitudinal position of the endpoint adapter within the tubular composite part is determinable.

16. A system for internally inspecting a tubular composite part to identify, and measure adhesive flow therewithin, the system comprising:
   an endpoint adapter configured to fit within and to maintain a consistent cross-sectional position within the tubular composite part, wherein the endpoint adapter comprises at least three frames including a first end frame, a second end frame, and an intermediate frame disposed between the first end frame and the second end frame, wherein the at least three frames are spaced apart in a longitudinal direction from and operably connected to one another, wherein a respective frame comprises three or more contact members for riding along an internal surface while in contact with the internal surface of the tubular composite part as the endpoint adapter is advanced longitudinally therethrough;

a plurality of optical fibers extending radially outward from the intermediate frame, wherein said endpoint adapter is configured to be moved longitudinally through the tubular composite part so as to receive light with the plurality of optical fibers following interaction of the light with the tubular composite part at each of a plurality of determinable longitudinal positions within the tubular composite part, wherein the plurality of optical fibers extend in a consistent relative position with respect to the internal surface of the tubular composite part;

a near infrared (NIR) imaging spectrometer configured to disperse the light being collected by each of the plurality of optical fibers across an NIR spectrum; and a NIR camera configured to generate images of the tubular composite part based on light being collected by each of the plurality of optical fibers following dispersal across the NIR spectrum.

17. A system according to claim 16, wherein the at least three frames are interconnected by longitudinally extending supports extending between the first end frame and the intermediate frame, and between the intermediate frame and the second end frame.

18. A system according to claim 16 wherein the plurality of optical fibers extend outward from the intermediate frame such that the optical fibers that extend radially outward from one portion of the intermediate frame have a greater density than the optical fibers that extend radially outward from another portion of the intermediate frame.

19. A system according to claim 16 wherein the NIR imaging spectrometer comprises an input slit, and wherein the system further comprises a sensor adapter configured to terminate the plurality of optical fibers such that end portions of the optical fibers are disposed at the input slit of the NIR imaging spectrometer.

20. A system according to claim 16 further comprising a plurality of input optical fibers configured to move with the endpoint adapter through the tubular composite part, wherein the plurality of input optical fibers are also configured to provide near-infrared light of a wavelength from about 750 nanometers to about 2500 nanometers in order to illuminate an internal surface of the tubular composite part.

* * * * *